TELEPHONE CODE RINGING CIRCUITS

Filed Dec. 28, 1964 9 Sheets-Sheet 1

INVENTOR
Zenon A. KULAR
Curphey & Erickson
AGENT

INVENTOR
Zenon A. KULAR
Murphey & Erickson
AGENT

April 16, 1968 Z. A. KULAR 3,378,644

TELEPHONE CODE RINGING CIRCUITS

Filed Dec. 28, 1964 9 Sheets-Sheet 3

INVENTOR
Zenon A. KULAR
Curphey & Erickson
AGENT

INVENTOR
Zenon A. KULAR
Curphey & Erickson
AGENT

INVENTOR
Zenon A. KULAR
Curphey & Erickson
AGENT

COMBINING UNIT

CODE RELAY CIRCUIT

INVENTOR
Zenon A. KULAR
Curphey & Erickson
AGENT

INVENTOR
Zenon A. KULAR
Curphey & Erickson
AGENT

INVENTOR
Zenon A. KULAR
Cumphey & Erickson
AGENT

INVENTOR
Zenon A. KULAR
Curphey & Erickson
AGENT

United States Patent Office 3,378,644

Patented Apr. 16, 1968

3,378,644

TELEPHONE CODE RINGING CIRCUITS

Zenon A. Kular, Dollard des Ormeaux, Quebec, Canada, assignor to Northern Electric Company Limited, Montreal, Quebec, Canada

Continuation-in-part of application Ser. No. 258,863, Feb. 15, 1963. This application Dec. 28, 1964, Ser. No. 421,264

13 Claims. (Cl. 179—84)

ABSTRACT OF THE DISCLOSURE

The invention provides an apparatus comprising a timing circuit for generating a basic train of pulses, a plurality of cascaded frequency dividers responsive to the timing circuit, each frequency divider generating a train of pulses having a submultiple frequency of the basic train of pulses and lagging the same in phase relationship, and a code circuit comprising a mixer circuit for generating a plurality of pulse trains having a space interval between pulses longer than a ringing cycle and a combining circuit for combining said plurality of pulse trains to generate various combinations of code signals.

The invention also contemplates the feature of providing two code ringing interrupters operating alternately under normal conditions, and a failure alarm circuit which, in case of failure of one of the interrupters, automatically connects the other interrupter to the distribution circuit and stops the alternating operation of the interrupters.

This invention relates to signalling circuits and more particularly to an apparatus for generating code ringing signals to a telephone circuit.

This application is a continuation-in-part of application Ser. No. 258,863, now Patent No. 3,155,478, filed Feb. 15, 1963.

In code ringing telephone signalling circuits, as is well known, code signals having pulses of varying lengths separated by varying spacing intervals are employed. For this purpose code ringing interrupters employing cams have been developed. Unless the cams are set at precise angles, however, the forms of the codes derived suffer such that those codes become indistinct and unrecognizable. Difficulty has also been encountered due to the vibration of the interrupter interfering with the form of the codes. Furthermore, the number of codes that can be obtained with cam type interrupters is limited by the length of shaft of interrupter and size of these devices.

The drawbacks of the prior art code ringing interrupters have been overcome, in accordance with the invention, by providing an apparatus comprising a timing circuit for generating a basic train of pulses and a plurality of cascaded frequency dividers responsive to the timing circuit, each frequency divider generating a train of pulses having a submultiple frequency of the basic train of pulses and lagging the same in phase relationship. The various wave trains generated by the pulse frequency dividers are applied to a code circuit comprising a mixer circuit for generating a plurality of pulse trains having a space interval between pulses longer than a ringing cycle and a combining circuit for combining said pulse trains to generate various combinations of code signals.

The invention also contemplates the feature of providing two code ringing interrupters operating alternately together with a failure alarm circuit which in case of failure of one interrupter automatically connects the other interrupter to the distribution circuit and stops the alternating operation of the interrupters.

A better understanding of the invention may be had by referring to the following description of a preferred embodiment of the invention in which.

Figure 13:
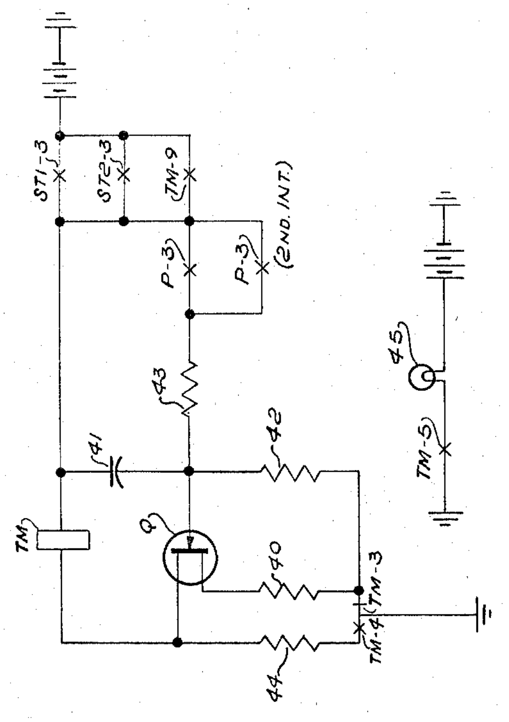
Figure 2:
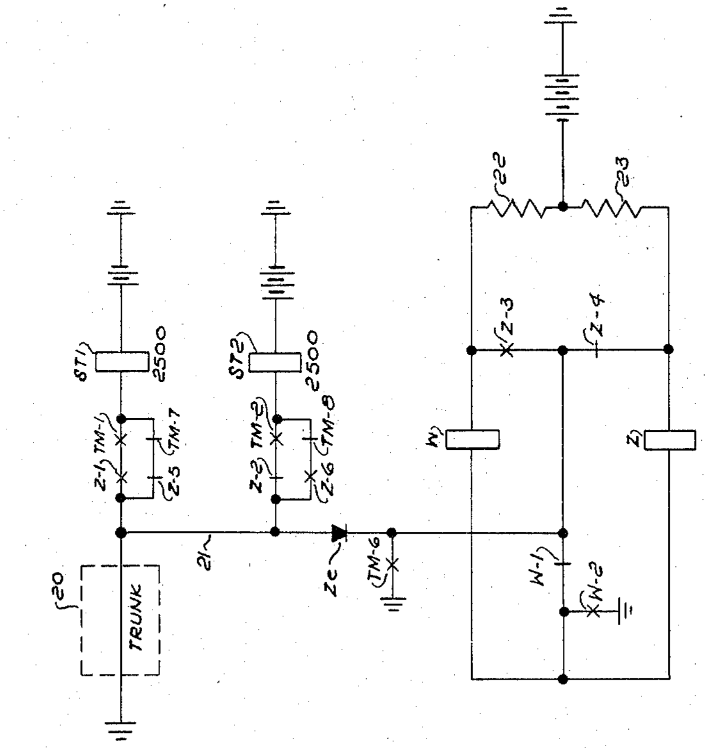
FIG. 2 illustrates a schematic circuit of a selection circuit suitable for the invention.

FIG. 13 which appears on the same sheet of drawings as FIG. 2 illustrates a failure alarm circuit.

Figure 1:
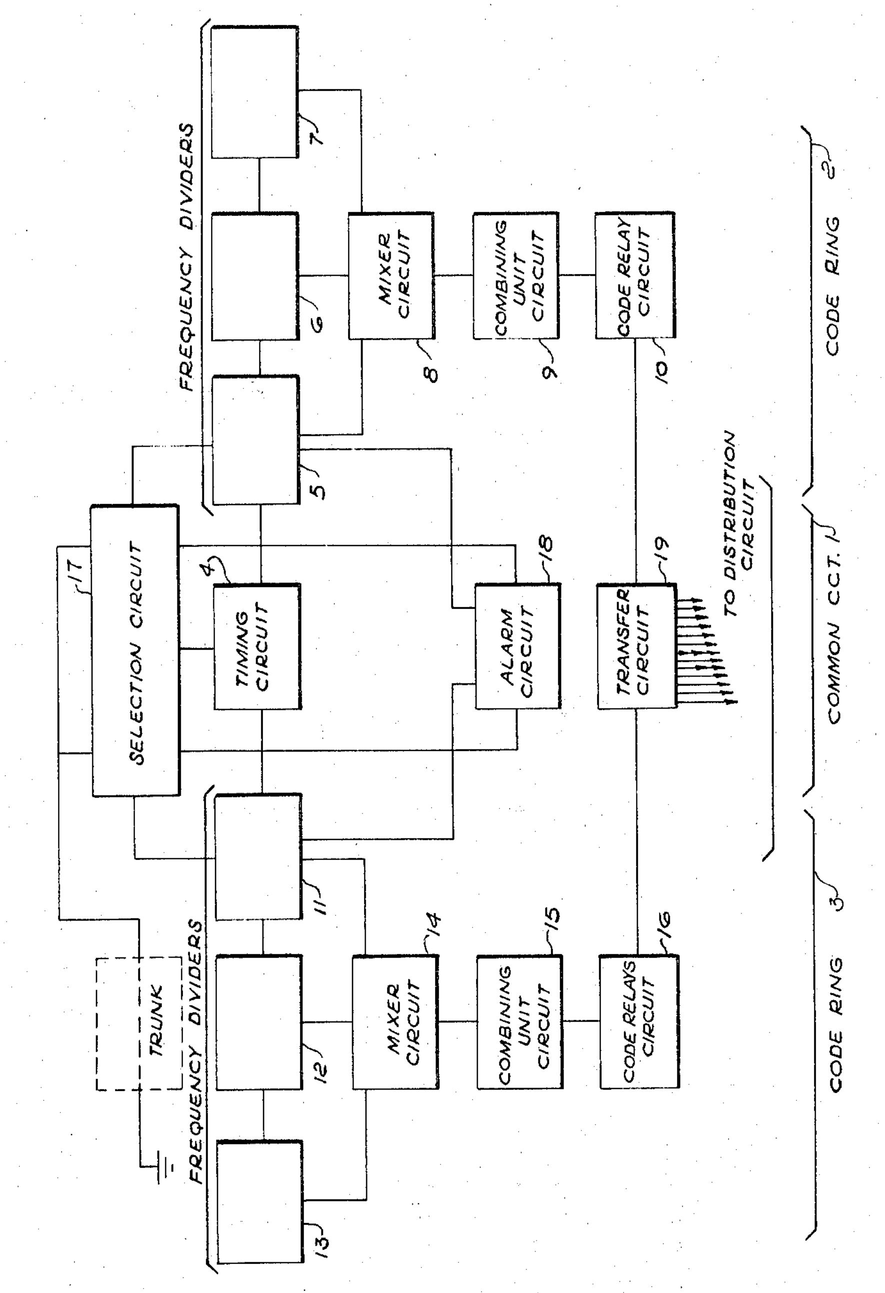
FIG. 1 illustrates a block diagram schematic of the invention.

Considering the drawings there is shown in FIG. 1 a block diagram of the ringing circuit of the invention which comprises a common circuit 1 and two identical code ringing interrupters 2 and 3. The common circuit 1 includes the timing circuit 4 which generates the basic train of pulses. The timing circuit 4 is connected to code ringing interrupter 2 comprising cascaded pulse frequency dividers 5, 6 and 7 which generate a number of pulse trains of submultiple frequencies. The outputs of frequency dividers 5, 6 and 7 are applied to a code circuit comprising mixer circuit 8, combining unit 9 and the code relays 10. The code circuit produces the code signals to be applied to the telephone signalling circuit.

Code ringing interrupter 3 is identical to code ringing interrupter 2 and comprises frequency dividers 11, 12 and 13, mixer circuit 14, combining unit 15 and code relays 16.

The circuit for energizing timing circuit 4 and for providing alternate operation of code ringing interrupters 2 and 3 comprises the selection circuit 17 which is connected to timing circuit 4 and code ringing interrupters 2 and 3. There is also provided a failure alarm circuit 18 which in case of failure of interrupter connects the other interrupter to the telephone signalling circuit and stops the alternate operation of the interrupters.

A transfer circuit 19 conneced to both interrupters provides for connection of the operating interrupter to the telephone signalling circuit.

Referring now to the detail description of the various blocks of FIG. 1, there is shown in FIG. 2 a circuit diagram of the selection circuit which provides for alternate energization of interrupters 2 and 3. When a trunk 20 requires ringing supply a ground is applied to lead 21. The ground is maintained on lead 21 until the ringing supply is no longer required.

Relays W and Z will commence service unoperated. The first ground applied to the selection circuit operates relay W through the circuit comprising battery, resistor 22, relay W, normally closed contacts W–1, diode *Ze* and ground. Relay W operates and locks itself up through its contacts W–2. Relay Z cannot operate because it is shunted to ground by normally closed contacts Z–4 and now closed contacts W–2. When ground is removed from conductor 21 relay Z will be operated through the circuit battery, resistor 23, relay Z, closed contacts W–2 and ground. The next ground on conductor 21 will shunt relay W through the now closed contacts Z–3 and de-energize it. Relay Z will however remain operated through now closed contacts W–1 until ground is removed from conductor 21.

If relay Z is not operated when ground is applied to conductor 21 and relay TM (to be described later) is not operated relay ST1 will operate through normally closed contacts Z–5 and TM–7. Contacts ST1–1 will connect ground to timing circuit 4 and start operation thereof as it will be described later in the disclosure. Contacts ST1–2 of relay ST1 cause operation of the pulse frequency dividers 5, 6 and 7 (also to be described later). Similarly if relay Z is operated and relay TM not operated relay ST2 will be energized through now closed contacts Z–6 and through normally closed contacts TM–8 thus closing contacts ST2–1 and connecting ground to timing circuit 4. Closure of contacts ST2–2 cause operation of the pulse frequency dividers 11, 12 and 13. This provides for alternate energization of code interrupters 2 and 3. Diode *Ze* prevents any ground connections in the selection circuit from operating relays ST1 and ST2.

Figure 3:
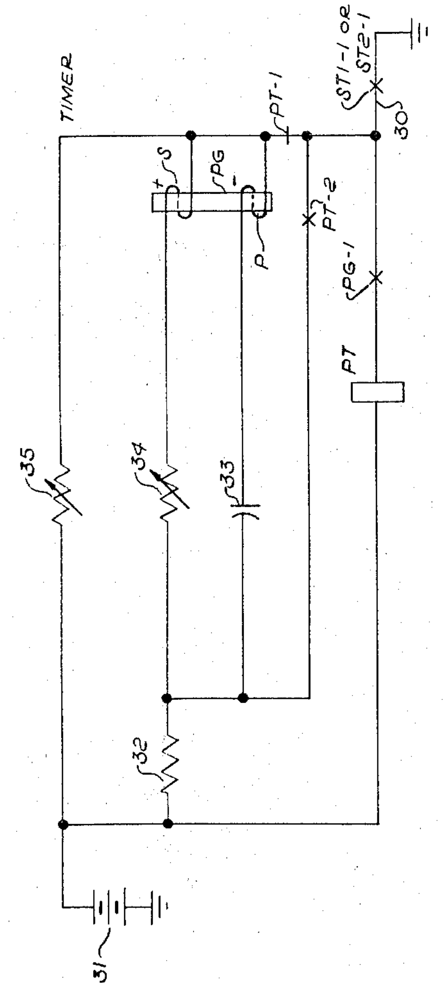
FIG. 3 illustrates a timing circuit.

Referring to FIG. 3, there is shown a circuit diagram of the pulse timing circuit. Relay PG is a polarized relay having two operated positions determined by the direction of current through its primary and secondary windings P and S respectively.

When contacts ST1–1 close ground is applied to lead 30 and a circuit is completed from battery 31, resistor 32, capacitor 33 and the primary P of relay PG. The charging current for capacitor 33 will hold the relay in its first operated position. As the capacitor becomes charged the current in the secondary winding S via the circuit comprising battery 31, resistor 32 and resistor 34 takes over and operates the relay PG into its second operated position. Operation of relay PG closes contact PG-1 and operates relay PT from battery 31. Operation of relay PT applies ground to the other side of capacitor 33. Capacitor 33 charge current now holds relay PG operated in the second position until the current drops to a value such that the current in the secondary winding from battery 31, resistor 35 takes over and operates relay PG back into its first position. The cycle repeats as long as ground is applied to lead 30.

Adjustment for equal operated and released times is accomplished by variable resistor 35. Speed or frequency adjustment is accomplished by variable resistor 34. These adjustments control the time required for capacitor PG charge current to drop sufficiently to allow the secondary winding to operate the relay PG. The timing circuit shown in FIG. 3 is known in the art as a capacitor-timed relay circuit. A description of such circuit may be found in a textbook entitled "The Design of Switching Circuits" by W. Keister et al. published by Van Nostrant pp. 407 to 414.

Figure 4:
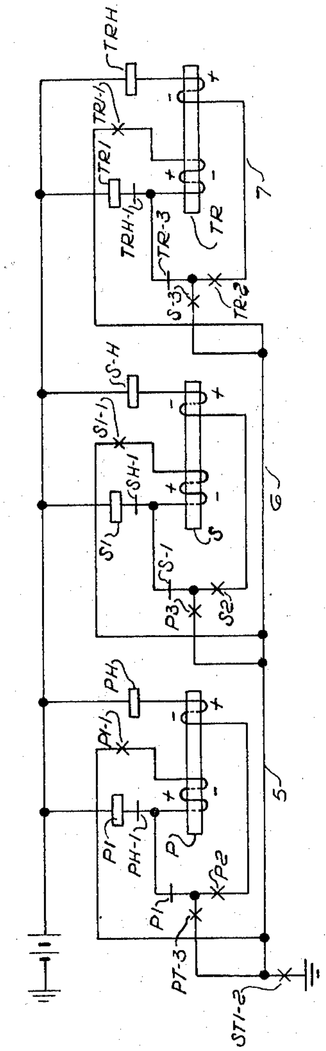
FIG. 4 illustrates a circuit comprising three pulse frequency dividers connected in cascade.

Referring to FIG. 4, when contacts ST1–2 (or ST2–2) are closed, and when contacts PT–3 close and open in response to energization and deenergization of relay PT in the timing circuit, FIG. 3, a basic train of pulses is applied to the pulse frequency divider 5. When contacts PT–3 close, ground is applied to relay P1 which operates and locks itself up through its own contacts P1–1. Relay P does not operate however until contacts PT–3 opens because the secondary winding of relay P is then shunted to ground. When ground is removed by the opening of contacts PT–3 relay P operates. Operation of relay P closes contacts P–2 and causes energization of relay PH when contacts PT–3 are closed for a second time. Energization of relay PH opens contacts PH–1 and causes deenergization of relay P1. Relay P remains energized through its secondary winding until contacts PT–3 reopens. It is seen with reference to FIG. 5, which shows the wave trains generated, that relay P operates at half the speed of relay PT and that relay P lags relay P1 by 90°.

Figure 5:
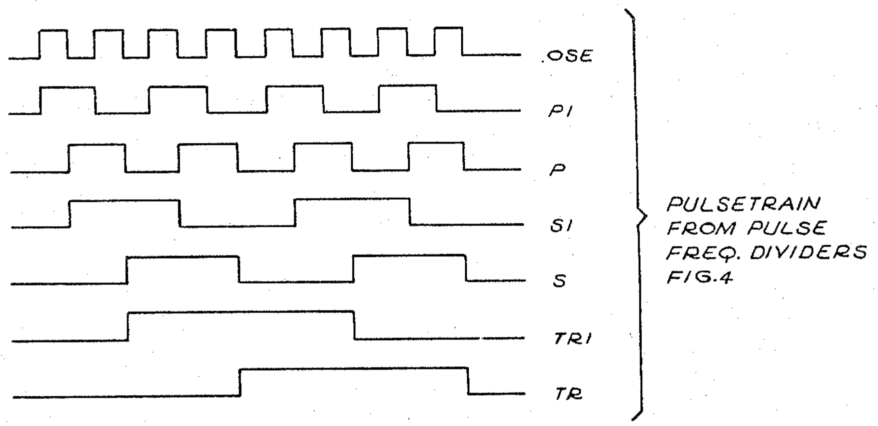
FIG. 5 illustrates the pulse trains derived from the pulse frequency dividers.

Energization of relay P closes contacts P3 and causes operation of relay circuit 6 exactly the same way as circuit 5. Energization of relay S of circuit 6 will finally cause energization of relay circuit 7. The various pulses generated by relays PT–P1–P–S1–S–TR1 and TR are shown in FIG. 5. The pulse frequency dividers shown in FIG. 4 are also well known and their description may be found in the above-mentioned textbook (Keister et al.) pp. 242–244.

Figure 6:
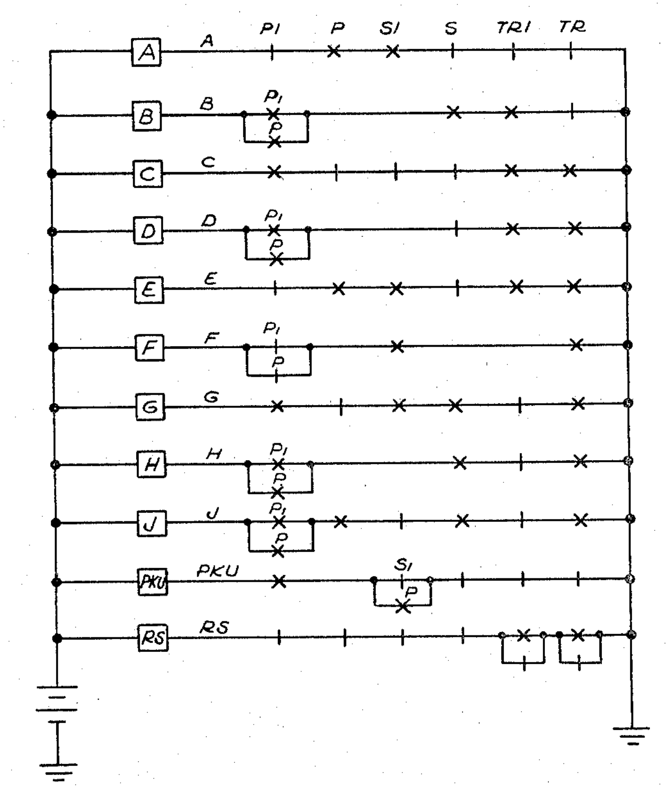
FIG. 6 illustrates the mixer circuit which is part of the code circuit.
Figure 7:
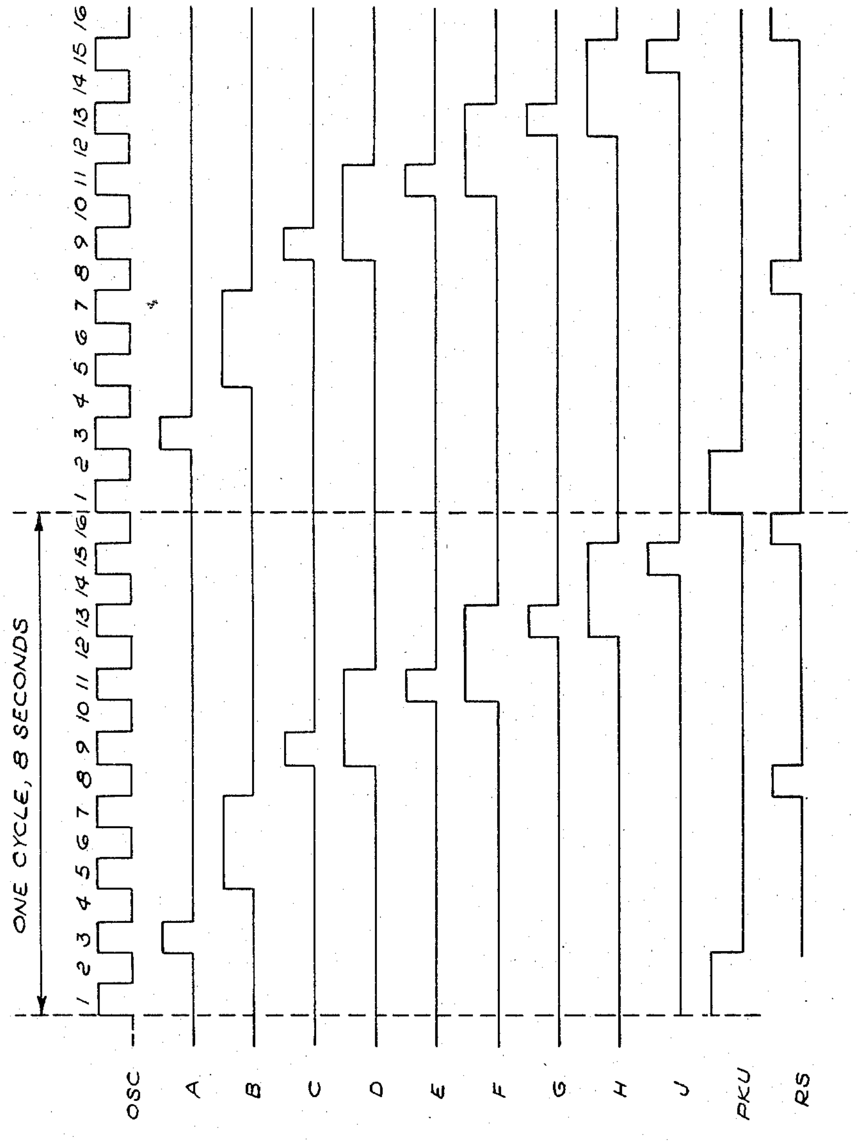
FIG. 7 illustrates the pulse train derived from the mixer circuit.

The mixer circuit shown in FIG. 6 comprises various series combinations of selected contacts of relays P1, P, S1, S, TR1 and TR. The selected combinations are applied to relays A, B, C, D, E, F, G, H, J, PKU and RS. The pulse trains produced by relays A, B, C, D, E, F, G, H, J, PKU and RS are illustrated in FIG. 7.

Figure 8:
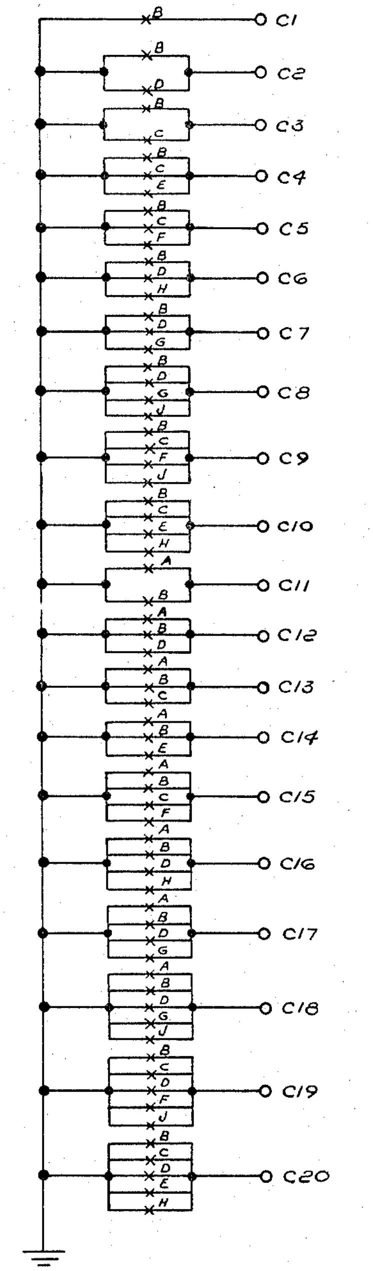
FIG. 8 illustrates a combining unit.
Figure 10:
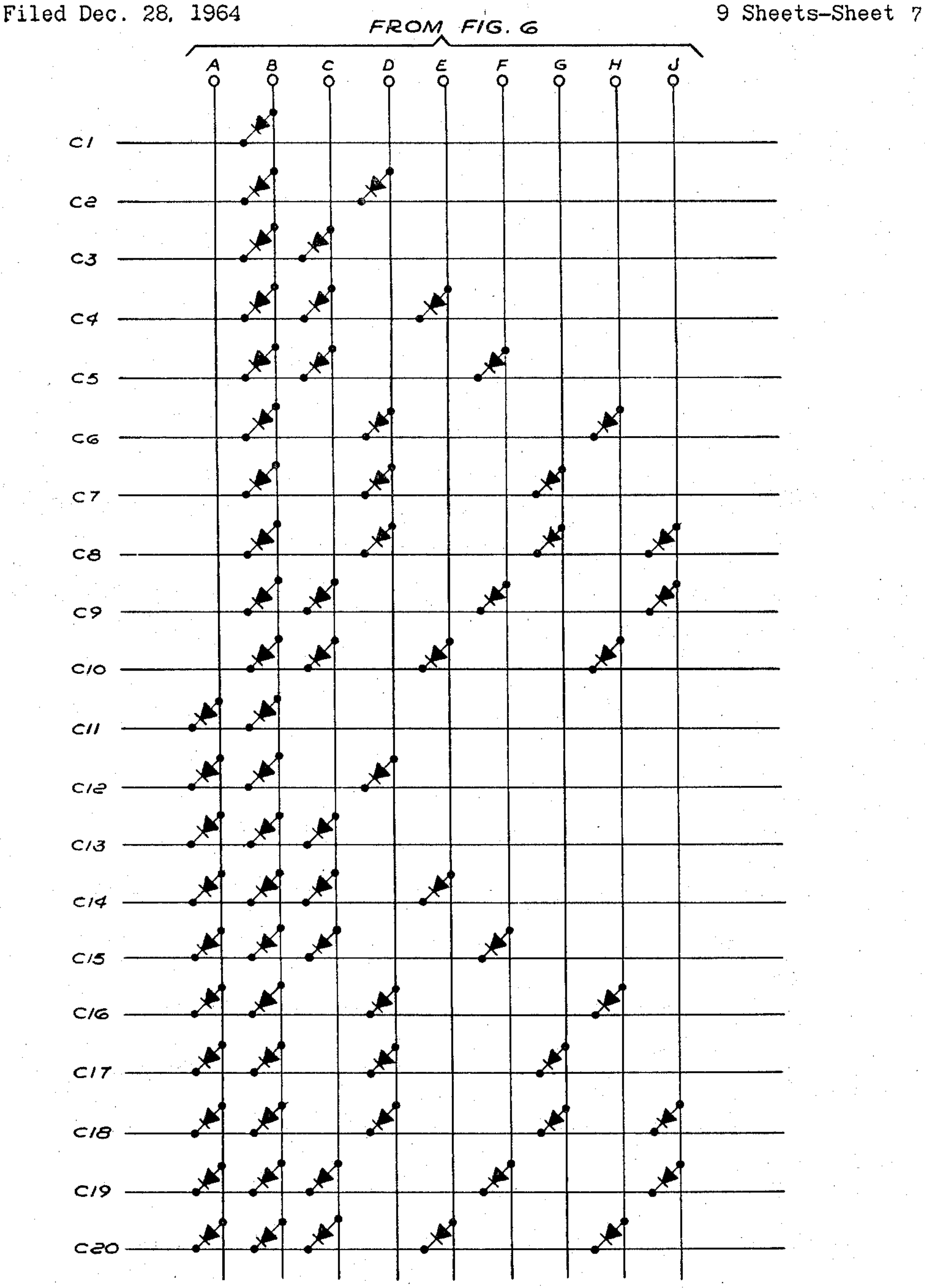
FIG. 10 illustrates a further embodiment of a code circuit.
Figure 11:
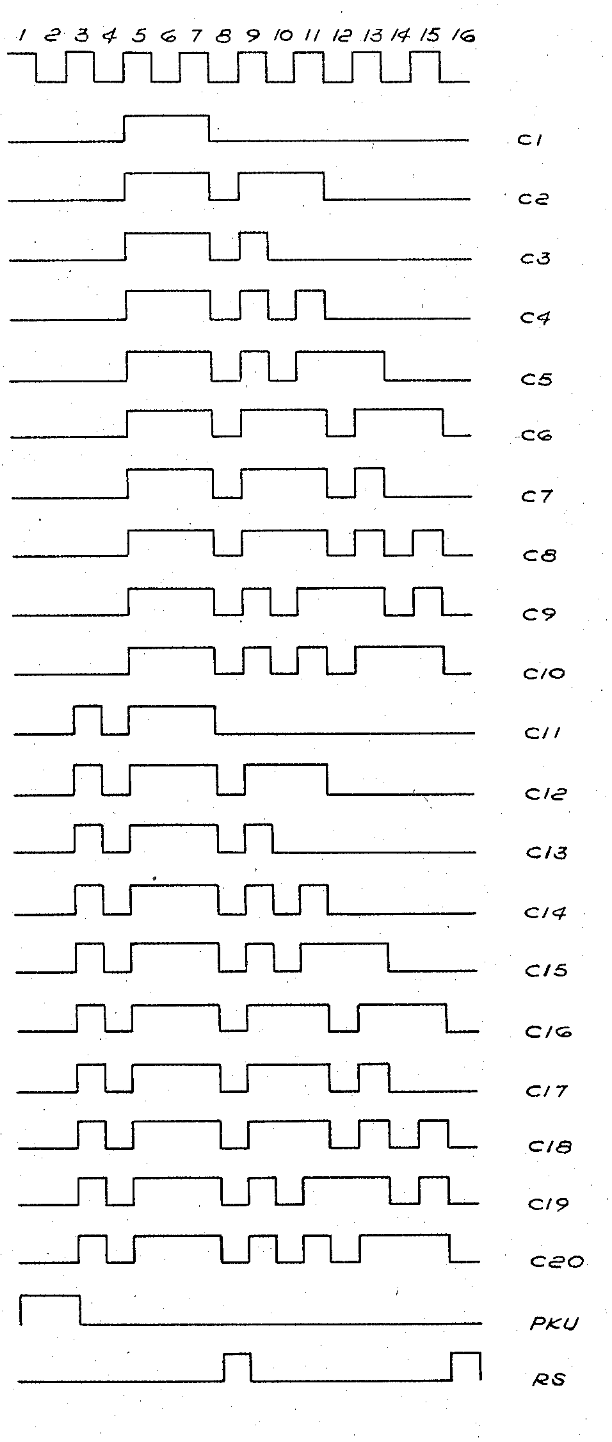
FIG. 11 illustrates the code signals derived from the code circuit.

Selected contacts of relays A, B, C, D, E, F, G, H, J are connected in parallel such as shown in the combining unit, FIG. 8 to form the code signals C1 through C20. The relays A, B, C, D, E, F, G and J shown in FIG. 5 and their contacts shown in FIG. 7 may be replaced by an arrangement of directional diodes such as shown in FIG. 10. The code signals are shown in FIG. 11.

Figure 9:
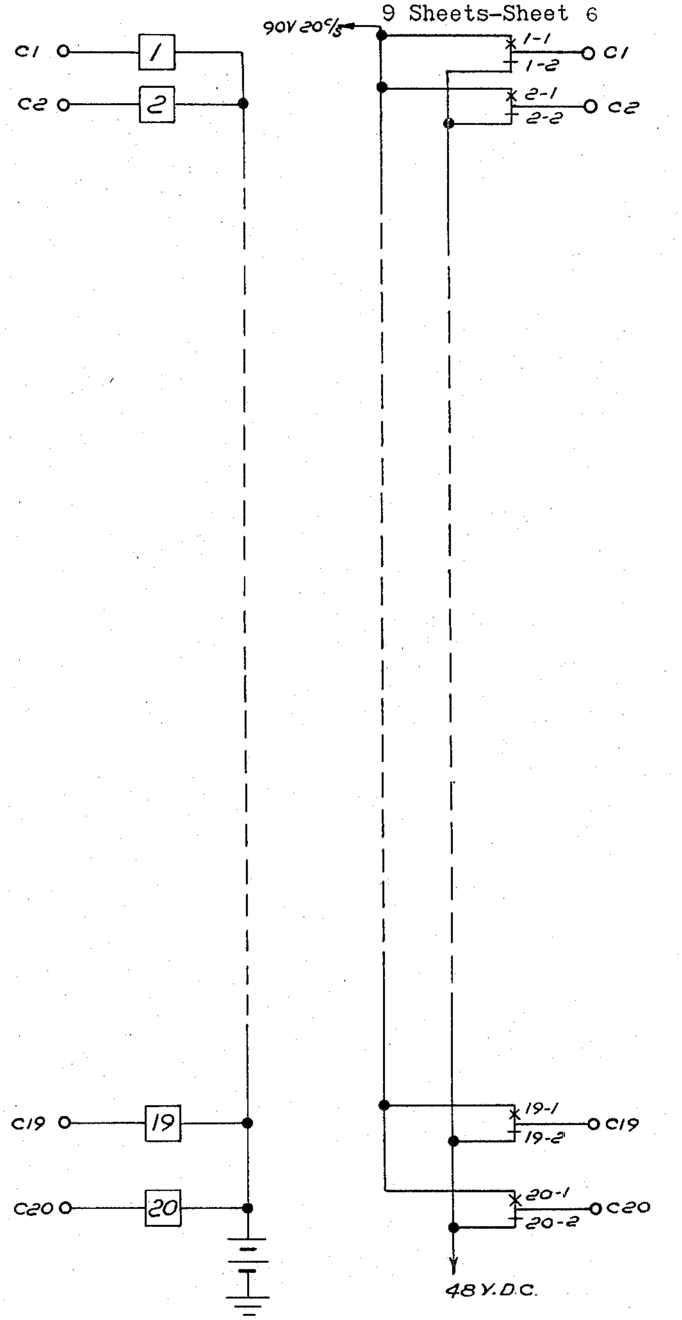
FIG. 9 illustrates a code relay circuit.

Typical telephone ringing circuits employ a 90 volts 20 cycle ringing current and a 48 volts direct current during the silent periods. Therefore the codes derived from the combining unit are applied to relays 1 through 20 shown in FIG. 9 of the drawings. Each of the above relays have a set of make and break contacts with the direct current source applied to one set and the 90 volts 20 c./s. source connected to the other set.

Figures 12A, 12B:
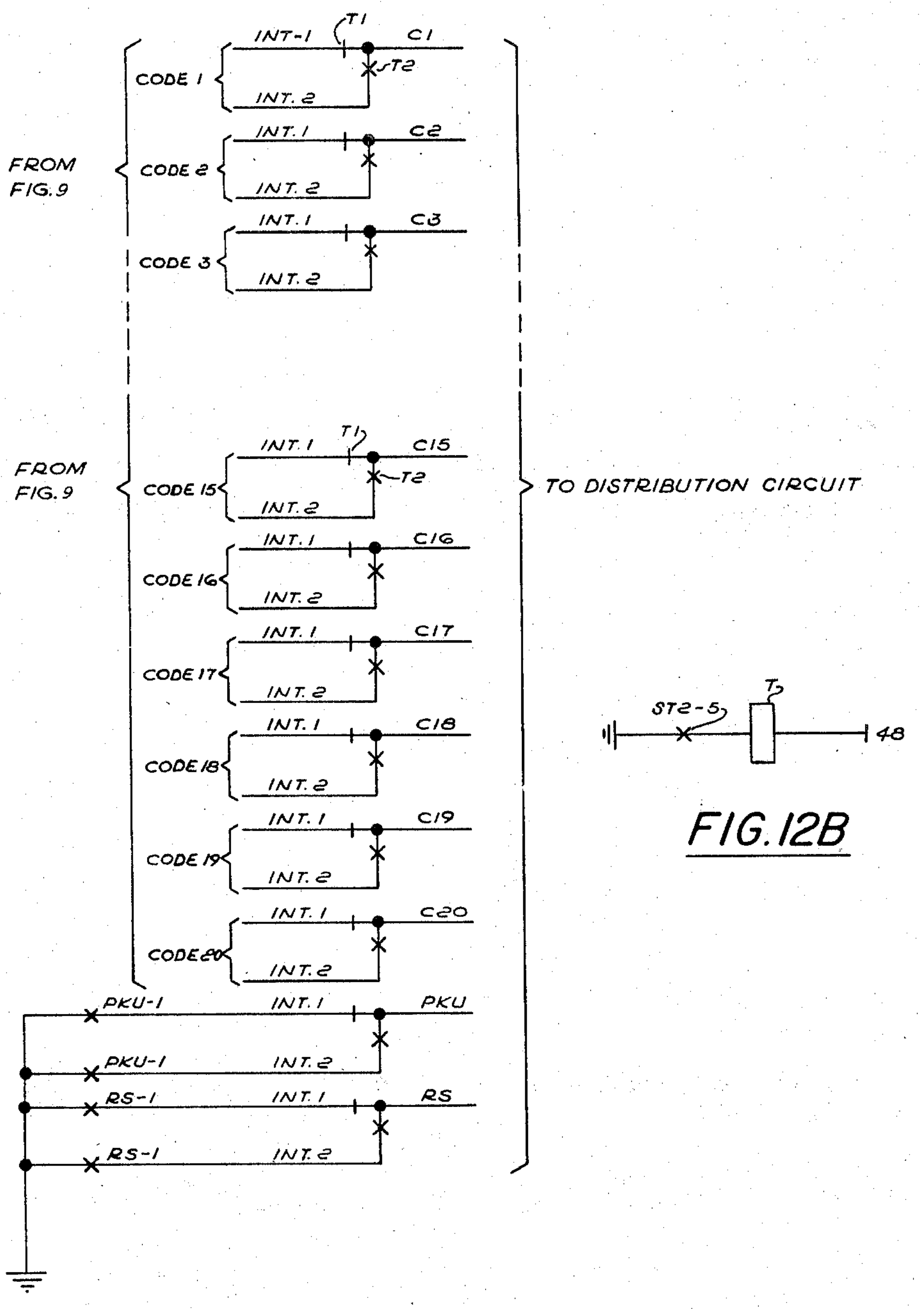
FIGS. 12A and 12B illustrate the transfer circuit.

The codes derived from the interrupter 2 and 3 are applied to a transfer circuit as shown in FIG. 12A which is controlled by a transfer relay T, FIG. 12B. Transfer relay T is energized by contacts ST2–5 of relay ST2 of the selection circuit. Contacts T–1 and T–2 of relay T connect the operating interrupter to the distribution circuit. Contacts PKU–1 and RS–1 are operated by relays RKU and RS, FIG. 6. The RKU signal originates the action of the ringing within the switching portion of the telephone circuitry. The RS signal is employed for the timing of the action in the ringing circuitry.

FIG. 13 shows the failure alarm circuit. When relays ST1 or ST2 operate closing contacts ST1–3 or ST2–3, battery is applied to the circuit relay TM, transistor Q, resistor 40, contacts TM–3 and ground. The current that flows is not sufficient however to operate relay TM. When relay ST1 or ST2 operates capacitor 41 is also charged through the circuit battery, capacitor 41, resistor 42, normally closed contacts TM–3 and ground. When relay P of the selected pulse frequency divider operate normally however capacitor 41 is continuously discharged through resistor 43 and contacts P–3 and the latter will not charge sufficiently to operate unijunction transistor. If, however, relay P of one of the pulse frequency dividers fails capacitor 41 will charge sufficiently and trigger the transistor Q. The current which will then flow will be sufficient to operate relay TM which will lock itself up through the circuit comprising its own contacts TM–4, TM–9 and resistor 44. Relay TM will apply ground to the selection circuit in FIG. 2 by closing contacts TM–6 and stops its operation. Relay TM also connects the other interrupter to the distribution circuit by closing its contacts TM–1 or TM–2. If relay ST1 was operating at the time of failure, it will be deenergized by the opening of contacts TM–7 and relay ST2 will be operated by closure of contacts TM–2. If, on the other hand, relay ST2 was operating at the time of failure (relay Z is then operated as explained previously), it will be deenergized by the opening of contacts TM–8 and relay ST1 will be energized by the closure of contacts TM–1. All future grounds applied to conductor 21 will be applied to the same interrupter.

Operation of relay TM will also energize lamp 45 to indicate failure of one interrupter.

In operation, a ground from the trunk circuit will energize the timing circuit FIG. 3 and initiate the operation of the selection circuit FIG. 2 to provide for alternate energization of interrupters 2 and 3. Both interrupters are connected to a transfer circuit 19 in FIG. 1 which connects the operating interrupter to the distribution circuit. In case of failure of one of the interrupters an alarm circuit FIG. 13 is provided which automatically stops the operation of the selection circuit and connects the other interrupter to the distribution circuit.

Each interrupter circuit comprises a number of pulse frequency dividers 5, 6 and 7 connected in cascade, each frequency divider generating a train of pulses which is a submultiple of the pulse frequency of the previous frequency divider and lagging the same in phase relationship. The first frequency divider is responsive to the timing circuit 4, FIG. 1. The pulse trains of the various frequency dividers are applied to a code circuit comprising a mixer circuit for generating a plurality of pulse trains having a space interval between pulses longer than a ringing cycle and a combining circuit for combining said plurality of pulse trains to generate various combinations of code signals.

What is claimed is:

1. A code ringing circuit for generating code ringing signals comprising:

(a) a timing circuit operating at a predetermined frequency and generating a basic train of pulses, (b) a plurality of cascaded pulse frequency dividers responsive to said timing circuit each of said pulse frequency dividers operating at a submultiple frequency of the previous frequency divider and lagging the same in phase relationship, (c) a code circuit comprising a mixer circuit responsive to said frequency dividers for generating a plurality of pulse trains having a space interval between pulses longer than a ringing cycle and a combining circuit responsive to said mixer circuit for combining said plurality of pulse trains to generate various combinations of code signals;

(d) a source of ringing signals; and (e) means connected to said source of ringing signals and responsive to the code signals for generating ringing signals in accordance with the code signals.

2. A code ringing circuit as defined in claim 1 wherein said timing circuit comprises a capacitor-timed relay circuit.

3. A code ringing circuit as defined in claim 2 wherein said capacitor-timed relay circuit includes adjusting resistors providing for equal operated and released times.

4. A code ringing circuit as defined in claim 2 wherein said capacitor-timed relay circuit includes adjusting resistors for adjustment of the frequency of the timing circuit.

5. A code ringing circuit as defined in claim 1 wherein each pulse frequency divider comprises a three relay circuit, the first pulse applied to the circuit operating the first relay, the removal of the first pulse causing operation of the second relay, the second pulse applied to the circuit releasing the first relay and operating the third relay, the removal of the second pulse releasing the second and third relay and completing the cycle, wherein the first and second relays generate two trains of pulses which are half the frequency of the previous train of pulses and whereby the train of pulses generated by the second relay lags the train generated by the first relay by 90 degrees.

6. A code ringing circuit as defined in claim 5 wherein said mixer circuit comprises a plurality of circuits each comprising a relay connected in series with various combinations of selected contacts of the relays of said pulse frequency dividers, the simultaneous closure of said selected contacts in each circuit causing operation of the associated relay and generating one of said plurality of pulse trains.

7. A code ringing circuit as defined in claim 6 wherein said combining circuit comprises various combinations of contacts of the relays of said last mentioned circuits for generating said code signals.

8. A code ringing circuit as defined in claim 5 wherein said mixer circuit comprises a plurality of circuits including various series combinations of selected contacts of said pulse frequency dividers, the simultaneous closure of said selected contacts in each circuit generating one of said plurality of pulse trains.

9. A code ringing circuit as defined in claim 8 wherein said combining circuit comprises a matrix circuit having a number of input circuits connected to a selected number of output circuits, each input circuit including one of said plurality of circuits of said mixer circuit, each output circuit generating said code signals.

10. A code ringing circuit for generating code ringing signals comprising:

(a) a timing relay circuit operating a set of contacts at a predetermined frequency, (b) a plurality of cascaded pulse frequency divider relay circuits having at least one set of contacts, each of said pulse frequency divider relay circuits having a set of contacts located in the energizing circuit of the subsequent relay the first relay of said series being energized by the contacts of the timing relay circuit; each of said cascaded frequency divider relay circuit operating at a submultiple frequency of the previous frequency divider relay circuit and lagging the same in phase relationship, (c) a code circuit including a mixer circuit comprising a plurality of relay circuits each having various series combinations of selected contacts of said pulse frequency dividers for generating a plurality of pulse trains having a space interval between pulses longer than a ringing cycle, and a combining circuit responsive to energization of said relay circuits for generating various combinations of code signals, (d) a source of ringing signals; and (e) means connected to said source of ringing signals and responsive to the code signals for generating ringing signals in acordance with the code signals.

11. A code ringing system for generating code ringing signals to a telephone line comprising:

(a) two code ringing circuits, each code ringing circuit having a timing circuit operating at a predetermined frequency and generating a basic train of pulses, a plurality of cascaded pulse frequency dividers responsive to said timing circuit, each pulse frequency divider operating at a submultiple frequency of the previous frequency divider and lagging the same in phase relationship, a code circuit comprising a mixer circuit responsive to said frequency dividers for generating a plurality of pulse trains having a space interval between pulses longer than a ringing cycle and a combining circuit responsive to said mixer circuit for combining said plurality of pulse trains to generate various combinations of code signals, a source of ringing signals and means connected to said source and responsive to said code signals for generating ringing signals in accordance with the code signals, (b) a selection circuit for alternately operating said code ringing circuits, (c) means for connecting the operating ringing circuit to the telephone line, and (d) a failure alarm circuit responsive to failure of one of the code ringing circuits for stopping the alternate operation of said code ringing circuits and for permanently connecting the other code ringing circuit to the telephone line.

12. A code ringing system as defined in claim 11 wherein said selection circuit comprises a flip-flop circuit having two relays which are alternately operated in response to consecutive energization of the selection circuit, and two corresponding start relays responsive to the operation of their associated flip-flop relays for alternately energizing said code ringing circuits.

13. A code ringing system as defined in claim 11 wherein said alarm circuit comprises a timing circuit which is adapted to become energized when one of the two code ringing circuits fails to operate within a predetermined time interval, and a relay circuit responsive to the energization of said timing circuit for stopping the alternating operation of said code ringing circuit and for permanently connecting the other code ringing circuit to the telephone line.

References Cited

UNITED STATES PATENTS

| | | | |
|---|---|---|---|
| 2,740,845 | 4/1956 | Mills et al. | 179—84 |
| 2,946,043 | 7/1960 | Reemstra et al. | 340—170 |
| 3,059,061 | 10/1962 | Merkel | 179—84 |

KATHLEEN H. CLAFFY, *Primary Examiner.*

WILLIAM C. COOPER, *Examiner.*

H. ZELLER, R. LINN, *Assistant Examiners.*